US006953558B2

(12) United States Patent
Monical

(10) Patent No.: US 6,953,558 B2
(45) Date of Patent: Oct. 11, 2005

(54) PROCESS FOR REDUCING NITROGEN OXIDE EMISSIONS

(75) Inventor: Valerie S. Monical, Houston, TX (US)

(73) Assignee: Solutia, Inc., St. Louis, MO (US)

( * ) Notice: Subject to any disclaimer, the term of this patent is extended or adjusted under 35 U.S.C. 154(b) by 99 days.

(21) Appl. No.: 10/236,259

(22) Filed: Sep. 6, 2002

(65) Prior Publication Data

US 2004/0048210 A1 Mar. 11, 2004

(51) Int. Cl.[7] ............................ B01J 8/00; C01B 21/00; C01C 3/00

(52) U.S. Cl. ..................... 423/235; 423/236; 423/239.1

(58) Field of Search ................................ 423/235, 236, 423/239.1

(56) References Cited

U.S. PATENT DOCUMENTS

| | | | | |
|---|---|---|---|---|
| 3,044,844 A | | 7/1962 | Maury et al. | |
| 3,900,554 A | | 8/1975 | Lyon | |
| 3,970,739 A | * | 7/1976 | Shiraishi et al. | 423/235 |
| 3,988,423 A | * | 10/1976 | Ohrui et al. | 423/236 |
| 4,080,425 A | | 3/1978 | Tanaka et al. | |
| 4,087,372 A | | 5/1978 | Saitoh et al. | |
| 4,115,515 A | | 9/1978 | Tenner et al. | |
| 4,507,269 A | | 3/1985 | Dean et al. | |
| 4,624,840 A | | 11/1986 | Dean et al. | |
| 4,636,370 A | | 1/1987 | Dean et al. | |
| 4,954,323 A | | 9/1990 | Sockell | |
| 5,419,286 A | | 5/1995 | Edison et al. | |
| 5,547,650 A | | 8/1996 | Edgar et al. | |
| 5,552,128 A | * | 9/1996 | Chang et al. | 423/235 |
| 5,629,444 A | | 5/1997 | Gibson et al. | |
| 5,801,266 A | | 9/1998 | Ishii | |

FOREIGN PATENT DOCUMENTS

| | | | |
|---|---|---|---|
| JP | 2002113331 | A2 | 4/2002 |
| WO | WO 03/014016 | A1 | 2/2003 |

OTHER PUBLICATIONS

Shelton, Harold L.; Find The Right Low–$NO_x$ Solution, Environmental Engineering World, Nov.–Dec. 1996, pp. 24–27.

* cited by examiner

*Primary Examiner*—Stanley S. Silverman
*Assistant Examiner*—Jonas N. Strickland
(74) *Attorney, Agent, or Firm*—Banner & Witcoff, Ltd.; John P. Foryt

(57) ABSTRACT

A non-catalytic process for reducing nitrogen oxide ($NO_x$) emissions in the combustion effluent of a stationary combustion apparatus is provided comprising contacting, in the combustion zone of the combustion apparatus, an effective amount of at least one nitrile compound with a waste stream, an auxiliary fuel stream, and air at a temperature sufficient to reduce the $NO_x$ emissions in the combustion effluent.

24 Claims, No Drawings

PROCESS FOR REDUCING NITROGEN OXIDE EMISSIONS

BACKGROUND OF THE INVENTION

This invention relates to a non-catalytic process for reducing nitrogen oxide ($NO_x$) emissions in the combustion effluent of a stationary combustion apparatus by contacting a nitrile compound with a waste stream, an auxiliary fuel stream, and air in the combustion zone of the combustion apparatus. In one aspect, this invention relates to a non-catalytic process for reducing $NO_x$ emissions in the combustion effluent of a stationary combustion apparatus by contacting a nitrile compound with an absorber off-gas (AOG) stream produced in a chemical plant, such as an acrylonitrile production process, an auxiliary fuel stream, and air in the combustion zone of the combustion apparatus.

As is well known, various oxides of nitrogen are produced during the combustion of most fuels with air. In general, these oxides result either from the oxidation of nitrogen in the air at the elevated temperatures of combustion or from the oxidation of nitrogen contained in the fuel. Such formation can occur in both catalytic and non-catalytic combustion although the formation is more predominant in non-catalytic combustion.

Various post-combustion technologies have been developed for reducing the concentration of $NO_x$ in combustion effluents. Post-combustion technologies have focused on non-selective gas phase $NO_x$ reduction, ammonia based selective catalytic reduction (SCR), and selective non-catalytic reduction (SNCR) using ammonia, urea, cyanuric acid, isocyanate, hydrazine, ammonium sulfate, atomic nitrogen, methyl amines, or bi-urates.

Other $NO_x$ reduction technologies include low $NO_x$ burners, air and fuel staging, flue gas recirculation, and catalytic scrubbing.

In Shelton, H. L., "Find the Right Low-$NO_x$ Solution", Environmental Engineering World, November-December 1996, pp. 24–27, it is disclosed that burning fuel oil with nitrogen compounds or other non-conventional nitrogen-bearing fuels such as amines, HCN and other nitrile will increase $NO_x$ emissions. Shelton also discloses a complicated multi-stage thermal oxidizer for burning nitrites which feeds air, natural gas, a nitrogen-containing aqueous organic stream, and a liquid HCN stream to the burner section and then adds an absorber off-gas stream (low-oxygen, 400–600 ppm $NO_x$) to the first oxidizing stage with the operating at 2300–2600° F. (1260–1427° C.). In a second reducing stage, which feeds additional absorber off-gas and operates at 1800° F. (982° C.), $CN^-$ radicals are disclosed to react with $NO_x$ producing CO as a byproduct. A third reoxidizing stage adds additional air and operates at 1600° F. (871° C.) to produce a stack gas having <200 ppm $NO_x$.

SNCR technology which is commercially practiced uses ammonia and urea as reducing agents. However, a SNCR process which avoids the need for special mixing or injection hardware is desirable. It is also desirable to have a SNCR process which can use a lower temperature range than is typical in current commercial SNCR processes, such as ammonia SNCR, as lower temperature operation reduces fuel requirements in the combustion apparatus. It is also desirable to have a SNCR process which does not require a complicated multi-stage combustion apparatus. Surprisingly, a commercially practical process for reducing nitrogen oxide ($NO_x$) emissions in the combustion effluent of a typical stationary combustion apparatus using a nitrile compound at lower temperatures than used in current SNCR processes has now been discovered.

SUMMARY OF THE INVENTION

According to the invention, a non-catalytic process for reducing nitrogen oxide ($NO_x$) emissions in the combustion effluent of a stationary combustion apparatus is provided comprising contacting, in the combustion zone of the combustion apparatus, an effective amount of at least one nitrile compound with a waste stream, an auxiliary fuel stream, and air at a temperature sufficient to reduce the $NO_x$ emissions in the combustion effluent.

Further according to the invention, a non-catalytic process for reducing $NO_x$ emissions in the combustion effluent of a stationary combustion apparatus is provided comprising contacting, in the combustion zone of the combustion apparatus, an effective amount of at least one nitrile compound with an absorber off-gas (AOG) stream from a chemical plant, an auxiliary fuel stream, and air at a temperature sufficient to reduce the $NO_x$ emissions in the combustion effluent.

In one embodiment of the invention, the AOG stream for combustion in the non-catalytic process of the invention is produced in an acrylonitrile production process. In another embodiment, the combustion apparatus is an incinerator.

BRIEF DESCRIPTIION OF THE DRAWINGS

NOT APPLICABLE.

DETAILED DESCRIPTION OF THE INVENTION

This invention provides a non-catalytic process for reducing nitrogen oxide ($NO_x$) emissions in the combustion effluent of a stationary combustion apparatus comprising contacting, in the combustion zone of the combustion apparatus, an effective amount of at least one nitrile compound with a waste stream, an auxiliary fuel stream, and air at a temperature sufficient to reduce the $NO_x$ emissions in the combustion effluent. As used herein, the term "combustion zone" can be an oxidizing zone or a reducing zone (in the case of a combustion apparatus having both oxidizing and reducing zones) and will depend on the configuration of the specific combustion apparatus.

The waste stream can be either a stream containing one or more organic compounds or a non-organic containing stream. It is currently preferred that the waste stream is a nitrogen containing waste stream. Waste streams containing organic compounds are typically waste streams of an organic chemical production process. Examples of organic chemical production process waste streams include, but are not limited to, absorber off-gas streams produced in a chemical plant, such as an absorber off-gas produced in an acrylonitrile production process. Non-organic containing waste streams are typically waste streams of an inorganic chemical production process, such as a nitric acid production process.

Nitrile compounds that can be employed according to the invention include nitrile compounds represented by the formula R-CN, wherein R is selected from hydrogen, an aliphatic hydrocarbon group, an alicyclic hydrocarbon group, or an aromatic hydrocarbon group.

The aliphatic hydrocarbon group includes, but is not limited to, saturated hydrocarbon groups having about 1 to 12 carbon atoms, preferably about 1 to 6 carbon atoms, or unsaturated hydrocarbon groups having about 2 to 12 carbon atoms, preferably about 2 to 6 carbon atoms. Examples of suitable saturated aliphatic hydrocarbon groups include methyl, ethyl, propyl, isopropyl, butyl, isobutyl, s-butyl, t-butyl, pentyl, hexyl, octyl, decyl, and the like. Examples of suitable unsaturated aliphatic hydrocarbon groups includes vinyl, allyl, 1-propenyl, isopropenyl, 2-butenyl, ethynyl, 2-propynyl, and the like.

The alicyclic hydrocarbon group includes, but is not limited to, cycloalkyl and cycloalkene groups having about 3 to 10 carbon atoms. Examples of suitable alicyclic hydrocarbon groups include cyclopropyl, cyclobutyl, cyclopentyl, cyclohexyl, cyclooctyl, and cycloalkylene groups corresponding to these cycloalkyl groups.

The aromatic hydrocarbon group includes, but is not limited to, aryl groups having about 6 to 14 carbon atoms, and alkaryl and aralkyl groups having about 7 to 15 carbon atoms. Examples of suitable aromatic hydrocarbon groups include phenyl, naphthyl, benzyl, phenethyl, tolyl, xylyl, and the like.

Examples of suitable aliphatic nitriles include acetonitrile, propionitrile, butyronitrile, isobutyronitrile, valeronitrile, isovaleronitrile, capronitrile and other saturated mononitriles; malonitrile, succinonitrile, glutaronitrile, adiponitrile; unsaturated nitriles (e.g. acrylonitrile, methacrylonitrile, allyl cyanide, crotononitrile), and the like. Preferred aliphatic nitriles include acetonitrile, acrylonitrile, methacrylonitrile, propionitrile, butyronitrile, succinonitrile, fumaronitrile, crotonitrile, and mixtures thereof.

Examples of suitable alicyclic nitriles include cyclopentanecarbonitrile, cyclohexanecarbonitrile, and the like.

Examples of suitable aromatic nitriles include benzonitrile, α-naphthonitrile, β-naphthonitrile, benzyl cyanide, and the like. The preferred aromatic nitrile is benzonitrile.

The currently preferred nitriles are acetonitrile, acrylonitrile, propionitrile, succinonitrile, fumaronitrile, crotonitrile, and hydrogen cyanide, with acrylonitrile, propionitrile, and hydrogen cyanide being most preferred due to the excellent results obtained therewith.

The nitrile compounds described above are either commercially available or can be prepared by any conventional process known to those of skill in the art. Acrylonitrile and hydrogen cyanide can be produced by the ammoxidation of propylene. Propionitrile can be obtained as a byproduct of the adiponitrile manufacturing process. Other aliphatic nitrites, for example, may be prepared by reacting an alkyl halide with sodium cyanide or other alkali metal cyanide. The aromatic nitrites can be produced by, for instance, a process comprising diazotizing an amine and allowing the resultant product to react with copper (I) cyanide, or other routes. Benzonitrile, for example, can be produced by reacting benzoic acid with urea in the presence of a metallic catalyst.

The effective amount of nitrile employed in the process of the invention can conveniently be expressed as the total concentration of nitrites relative to the waste stream, and will depend on factors such as the composition and flow rate of the specific waste stream to be processed in the combustion apparatus, and the specific combustion apparatus. The effective amount of nitrile employed in the process of the invention will be readily determined by one of ordinary skill without undue experimentation based on the teachings in the instant application and knowledge of the particular waste stream to be treated and combustion apparatus to be used. Typically, the effective amount of nitrile employed in the process of the invention on a weight basis is broadly an amount of about 20 ppm to about 15,000 ppm, preferably about 100 ppm to about 12,000 ppm, and more preferably about 300 ppm to about 7,000 ppm, of the waste stream processed in the combustion apparatus. In the case where the waste stream contains a small amount of nitrile compound, such as typically present in the absorber off-gas stream from an acrylonitrile production process, the effective amount of nitrile employed in the process of the invention will be an amount greater than the amount typically present in the waste stream, e.g. absorber off-gas stream, to be processed. In the case where the waste stream as produced in the chemical production process contains nitrites, the effective amount of nitrile employed in the process of the invention on a weight basis is broadly an amount at least about 20 ppm, preferably about 20 ppm to about 10,000 ppm, and more preferably about 300 ppm to about 7,000 ppm, greater than the nitrile content in the waste stream as produced in the chemical production process.

The stationary combustion apparatus of the invention can be selected from a furnace, boiler, incinerator, or the like. As is well known, combustion is effected in stationary combustion equipment in a section of the apparatus commonly referred to as the firebox or combustion zone, where fuel is ignited in the presence of air with one or more burners. According to the process of the invention, the currently preferred combustion apparatus is an incinerator.

In the process of the invention, the fuel in the combustion apparatus comprises a waste stream (provided the waste stream comprises at least one organic compound), particularly a waste stream from a chemical production process, and an auxiliary fuel stream. When the waste stream does not contain organics, e.g. such as the off-gas of a nitric acid process, the fuel in the combustion apparatus comprises an auxiliary fuel stream. The auxiliary fuel stream can be any conventional fuel known to those skilled in the art, such as natural gas, fuel oil, and the like. The waste stream can be a single waste stream or it can be a combination of two or more waste streams. The preferred waste stream for use in the process of the invention is an absorber off-gas produced in a chemical plant, more preferably an absorber off-gas produced in an acrylonitrile production process. A typical absorber off-gas from an acrylonitrile production process contains nitrogen, oxygen, unreacted propylene, hydrocarbon impurities from the propylene feed stream, CO, $CO_2$, water vapor, and small quantities of acrylonitrile, acetonitrile, hydrogen cyanide, and other organonitriles.

The nitrile compound can be contacted with the waste stream, the auxiliary fuel stream, and air in the combustion zone of the combustion apparatus using any conventional method such as adding to the combustion apparatus as a separate liquid feed stream, adding to the combustion apparatus as a separate vapor stream, adding to the waste stream, e.g. the absorber off-gas stream, prior to adding the waste stream to the combustion apparatus, and the like.

When the nitrile compound is added as a separate liquid stream, it is currently preferred that the nitrile compound is hydrogen cyanide. When the nitrile compound is added as a separate vapor stream it is currently preferred that the nitrile compound is selected from acetonitrile, acrylonitrile, propionitrile, or mixtures thereof. When the nitrile compound is added as a separate stream, it can be added to the combustion zone of the combustion apparatus at the burner or slightly downstream of the burner.

When the nitrile compound is present in the waste stream being added to the combustion zone of the combustion apparatus, preferably the absorber off-gas stream produced in a chemical plant, and more preferably the absorber off-gas stream produced in an acrylonitrile production process, the nitrile compound is preferably added to the waste stream, e.g. absorber off-gas, prior to adding the waste stream to the combustion apparatus. When the absorber off-gas is produced in an acrylonitrile production process, at least a portion of the nitrile compound present in the acrylonitrile absorber off-gas can optionally be present in the absorber off-gas as produced in the acrylonitrile production process, i.e. the effective amount of nitrile compound can be achieved by adjusting the operating conditions of the acrylonitrile production process to produce an absorber off-gas containing more nitrile than would otherwise be present under normal operation.

The air fed to the combustion apparatus can be at ambient temperature or it can optionally be preheated, such as up to a temperature of about 1200° F. (649° C.). The amount of air fed to the combustion apparatus will depend on the amount and composition of the waste stream and auxiliary fuel stream. Generally, the amount of air will be that amount which will result in the combustion effluent, and therefore the resultant stack gas, containing about 0.5 volume % to about 12 volume % oxygen, preferably about 2 vol. % to about 4 vol. % oxygen, and more preferably about 2.5 vol. % to about 3.5 vol. % oxygen, on a dry basis.

The waste stream, and particularly the absorber off-gas stream, can be at the temperature of the process from which the stream is obtained or it can optionally be preheated, such as up to a temperature of about 600° F. (316° C.).

The combustion temperature, i.e. the temperature in the firebox or oxidizing zone of the combustion apparatus, in the process of the invention is that temperature sufficient to reduce the $NO_x$ emissions in the combustion effluent according to the process of the invention. The suitable combustion temperature will be readily apparent to one of ordinary skill in the art without undue experimentation and will depend on factors including, but not limited to, the specific nitrile compound present, the specific combustion apparatus used, the oxygen level in the combustion apparatus, the composition of the waste stream being treated, and the amount of nitrile based on the waste stream being treated. For example, the preferred combustion temperature increases as the nitrile level increases. Typically, the process of the invention can be conducted at a combustion temperature of about 1400° F. (760° C.) to about 1750° F. (954° C.), preferably about 1450° F. (788° C.) to about 1650° F. (899° C.), and more preferably about 1480° F. (804° C.) to about 1630° F. (888° C.). The process of the invention can be conducted at any suitable pressure depending on the desired feed stream temperatures and combustion temperature. It is currently preferred to conduct the combustion at a pressure of about 0.1 atm to about 100 atm. Such pressure will be readily apparent to one of ordinary skill in the art without undue experimentation. The residence time in the combustion zone of the combustion apparatus is the time sufficient under the operating conditions of the combustion apparatus to prevent significant nitrile breakthrough in the combustion effluent. Such residence time will be readily apparent to one of ordinary skill in the art without undue experimentation.

In a preferred embodiment of the invention, a non-catalytic process for reducing nitrogen oxide ($NO_x$) emissions in the combustion effluent of an incinerator is provided comprising contacting, in the combustion zone of the combustion apparatus, an effective amount of at least one nitrile compound selected from hydrogen cyanide, acetonitrile, acrylonitrile, propionitrile, butyronitrile, fumaronitrile, succinonitrile, benzonitrile, or mixtures thereof with the absorber off-gas (AOG) produced in an acrylonitrile production process, an auxiliary fuel stream, and air at a temperature in the combustion zone of the combustion apparatus of about 1400° F. (760° C.) to about 1750° F. (954° C.) to reduce the $NO_x$ emissions in the combustion effluent.

EXAMPLES

Example 1

The process of the invention using an incinerator for selective non-catalytic reduction of $NO_x$ was demonstrated by adding acrylonitrile (AN) into the lean water feed stream to the absorber in the product recovery area of an AN production process. The AN was added such as to result in an increase in the AN content of the absorber off-gas (AOG) stream without simultaneously increasing HCN or other organic compounds in the AOG. This example demonstrates the process of the invention wherein a nitrile compound is added to the AOG stream prior to introducing the AOG stream into the incinerator.

Two absorbers were used to produce the waste stream of the invention that was fed to a commercial incinerator in the Solutia Inc. acrylonitrile plant located in Alvin, Tex. The nominal feed rate of the total AOG stream (AOG1+AOG2) to the incinerator is approximately 550,000 lb/hr and the nominal composition prior to addition of AN to the AOG is given in Table 1. The auxiliary fuel used was natural gas. The temperature of the oxidizing zone of the combustion apparatus was 1625–1638° F. (885–892° C.) during the runs (temperature setpoint of 1630° F. (888° C.)). The air flow to the combustion apparatus was controlled to result in a stack gas oxygen content of 2.54–2.62% (setpoint=2.57%) (by volume, dry basis) and the air stream was preheated to a temperature of 941° F. (505° C.). The AOG was preheated to 460° F. (238° C.).

TABLE 1

| | AOG-Nominal Composition | |
|---|---|---|
| Component | AOG1 | AOG2 |
| HCN | 7 ppm | 47 ppm |
| Acrylonitrile | 13 ppm | 37 ppm |
| Acetonitrile | 0.08 wt. % | 0.15 wt. % |
| Water | 16.7 wt. % | 15.3 wt. % |
| Light Heavies | 0.14 wt. % | 0.15 wt. % |
| Succinonitrile | 11 ppm | 11 ppm |
| Acrolein Derivatives | 0.11 wt. % | 0.11 wt. % |
| Carbon Monoxide | 1.3 wt. % | 1.3 wt. % |
| Carbon Dioxide | 3.4 wt. % | 3.4 wt. % |
| Nitrogen | 74.5 wt. % | 75.9 wt. % |
| Oxygen | 2.9 wt. % | 2.9 wt. % |
| Propylene | 0.11 wt. % | 0.11 wt. % |
| Propane | 0.72 wt. % | 0.73 wt. % |

A control run with no added AN was run in the incinerator and samples taken prior to initiating addition of AN to the AOG. Immediately following the control run, AN was added to the AOG stream at a nominal concentration of 325 ppm and the incinerator run for a period of 40 min. Then the nominal AN concentration in the AOG stream was increased to 360 ppm and the incinerator was run for a period of 1 hr.

The incinerator effluent was analyzed for $NO_x$ content using an on-line continuous chemiluminescence analyzer (Thermo Environmental Instruments Inc. Model 42C Chemiluminescence NO—$NO_2$—$NO_x$ Analyzer) and the results are reported in Table 2.

TABLE 2

| Run | Fuel Gas Flow (lb/hr) | $NO_x$ (ppm) | AN conc. in AOG1 (ppm) | AN conc. in AOG2 (ppm) | % fuel reduction from control | % $NO_x$ reduction from control |
|---|---|---|---|---|---|---|
| Control | 4481 | 22 | 13 | 37 | N/A | N/A |
| 325 ppm | 4327 | 15 | 324 | 326 | 3.4 | 34.4 |
| 360 ppm | 4304 | 13 | 346 | 370 | 3.9 | 39.0 |

The results clearly demonstrate that addition of AN according to the process of the invention significantly reduces the $NO_x$ emissions.

Example 2

A test was conducted according to the procedure set forth in Example 1 except as noted herein. In one run, the effect of increasing the % oxygen in the stack gas was determined by increasing the stack gas setpoint to 2.80%. The temperature of the oxidizing zone of the combustion apparatus was 1622–1661° F. (883–905° C.) during the runs (temperature setpoint of 1630° F. (888° C.)).

A control run with no added AN was run in the incinerator and samples taken prior to initiating addition of AN to the AOG. Immediately following the control run, AN was added to the AOG stream to achieve a nominal concentration of 300 ppm and the incinerator run for a period of 47 min. Then the nominal AN concentration in the AOG stream was increased to 1900 ppm and the incinerator was run for a period of 58 min. The air flow was then increased and the incinerator was run for an additional period of 35 min.

The incinerator effluent was analyzed for $NO_x$ content and the results are reported in Table 3.

TABLE 3

| Run | Fuel Gas Flow (lb/hr) | $NO_x$ (ppm) | AN conc. in AOG1 (ppm) | AN conc. in AOG2 (ppm) | % fuel reduction from control | % $NO_x$ reduction from control |
|---|---|---|---|---|---|---|
| Control | 4716 | 43 | 17 | 69 | N/A | N/A |
| 300 ppm | 4536 | 26 | 269 | 330 | 3.8 | 39.1 |
| 1900 ppm | 3710 | 7 | 1843 | 1985 | 21.3 | 83.3 |
| 1900 ppm[1] | 3791 | 8 | 1867 | 2001 | 19.6 | 81.6 |

[1]run with increased % oxygen in stack gas

The results clearly demonstrate that addition of AN according to the process of the invention significantly reduces the $NO_x$ emissions. In addition, the results demonstrate that increasing the oxygen content in the incinerator stack gas resulted in a slight increase in $NO_x$ emissions, co-incident with the expected increase in fuel gas usage.

Example 3

A test was conducted according to the procedure set forth in Example 1 except as noted herein. The nitrile compound used in the test was propionitrile (PN). Based on a PN addition rate of 500 gph, a control run with no added PN and 4 inventive runs at 20, 40, 50, and 60% of the 500 gph PN addition rate (using a positive displacement pump to control the volumetric flow rate) were conducted.

The incinerator effluent was analyzed for $NO_x$ content and the results are reported in Table 4.

TABLE 4

| Run (PN flow % of 500 gph) | Fuel Gas Flow (lb/hr) | $NO_x$ (ppm) | PN conc. in AOG1 (ppm) calculated | PN cone. in AOG2 (ppm) calculated | % fuel reduction from control | % $NO_x$ reduction from control |
|---|---|---|---|---|---|---|
| Control-0% | 4273 | 44 | 0 | 0 | N/A | N/A |
| 20% | 3863 | 20 | 1140 | 1140 | 9.6 | 54.5 |
| 40% | 3684 | 15 | 2280 | 2280 | 13.8 | 65.9 |
| 50% | 3511 | 13 | 2850 | 2850 | 17.8 | 70.5 |
| 60% | 3306 | 11 | 3420 | 3420 | 22.6 | 75.0 |

The results clearly demonstrate that addition of PN according to the of the invention significantly reduces the $NO_x$ emissions.

We claim:

1. A non-catalytic process for reducing nitrogen oxide ($NO_x$) emissions in the combustion effluent of a stationary combustion apparatus comprising contacting, in the combustion zone of said combustion apparatus, an effective amount of at least one nitrile compound with a substantially undivided waste stream, an auxiliary fuel stream, and air at a temperature sufficient to reduce the $NO_x$ emissions in said combustion effluent.

2. The process of claim 1 wherein said nitrile is selected from the group consisting of nitriles represented by the formula R-CN, wherein R is selected from hydrogen, an aliphatic hydrocarbon group, an alicyclic hydrocarbon group, and an aromatic hydrocarbon group.

3. The process of claim 2 wherein said nitrile is selected from the group consisting of hydrogen cyanide, acetonitrile, acrylonitrile, propionitrile, butyronitrile, succinonitrile, fumaronitrile, crotonitrile, benzonitrile, and mixtures thereof.

4. The process of claim 1 wherein said stationary combustion apparatus is selected from the group consisting of an incinerator, a furnace, and a boiler.

5. The process of claim 4 wherein said stationary combustion apparatus is an incinerator.

6. The process of claim 1 wherein said nitrile is added to said combustion apparatus as a separate liquid feed stream.

7. The process of claim 6 wherein said nitrile is hydrogen cyanide.

8. The process of claim 1 wherein said nitrile is added to said combustion apparatus as a separate vapor feed stream.

9. The process of claim 8 wherein said nitrile is selected from the group consisting of acetonitrile, acrylonitrile, propionitrile, and mixtures thereof.

10. The process of claim 1 wherein said waste stream is the absorber off gas (AOG) produced in an acrylonitrile production process.

11. The process of claim 10 wherein said nitrile is added to said absorber off-gas prior to adding said absorber off-gas to said combustion apparatus.

12. The process of claim 10 wherein said nitrile is present in the absorber off-gas produced in an acrylonitrile production process.

13. The process of claim 1 wherein the amount of said nitrile compound is about 20 to about 10,000 ppm greater than the nitrile normally present in said waste stream.

14. The process of claim 1 wherein the temperature in the oxidation zone of said combustion apparatus is about 1400° F. (760° C.) to about 1750° F. (954° C.).

15. The process of claim 14 wherein the temperature in the oxidation zone of said combustion apparatus is about 1480° F. (804° C.) to about 1630° F. (888° C.).

16. The process of claim 1 wherein the volume % oxygen in said combustion effluent is about 0.5% to about 12%.

17. The process of claim 1 wherein said waste stream comprises at least one organic compound.

18. A non-catalytic process for reducing nitrogen oxide ($NO_x$) emissions in the combustion effluent of an incinerator comprising contacting, in the combustion zone of said incinerator, an effective amount of at least one nitrile compound selected from the group consisting of hydrogen cyanide, acetonitrile, acrylonitrile, propionitrile, butyronitrile, succinonitrile, fumaronitrile, crotonitrile, benzonitrile, and mixtures thereof with a substantially undivided stream of absorber off-gas (AOG) produced in an acrylonitrile production process, an auxiliary fuel stream, and air at a temperature in the oxidation zone of said incinerator of about 1400° F. (760° C.) to about 1750° F. (954° C.) to reduce the $NO_x$ emissions in said combustion effluent.

19. The process of claim 18 wherein said nitrile is added to said incinerator as a separate liquid feed stream.

20. The process of claim 18 wherein said nitrile is present in the absorber off-gas produced in an acrylonitrile production process.

21. The process of claim 18 wherein the amount of said nitrile compound is about 20 to about 10,000 ppm greater than the nitrile normally present in said waste stream.

22. The process of claim 18 wherein the volume % oxygen in said combustion effluent is about 0.5% to about 12%.

23. The process of claim 18 wherein the volume % oxygen in said combustion effluent is about 2% to about 4%.

24. The process of claim 18 wherein the temperature in the oxidation zone of said incinerator is about 1480° F. (804° C.) to about 1630° F. (888° C.).

* * * * *